United States Patent

[11] 3,632,174

[72] Inventor Roy W. Miller
           Highland, Ind.
[21] Appl. No. 72,469
[22] Filed Sept. 15, 1970
[45] Patented Jan. 4, 1972
[73] Assignee Pullman Incorporated
           Chicago, Ill.

[54] PNEUMATIC DISCHARGE ARRANGEMENT FOR HOPPERS
     11 Claims, 10 Drawing Figs.
[52] U.S. Cl. .................................................. 302/27,
           214/83.2, 222/144.5, 222/509, 302/52
[51] Int. Cl. ........................................B65g 53/06,
           B65g 53/14
[50] Field of Search......................................... 214/83.2;
           222/144.5, 509; 302/27, 42, 52

[56] References Cited
     UNITED STATES PATENTS
2,743,026  4/1956  Edwards....................... 214/83.2
2,939,592  6/1960  Hoffstetter..................... 214/83.2
3,105,721  10/1963 Collins et al................... 302/52
3,350,139  10/1967 Shaddock....................... 302/27
3,490,623  1/1970  Steckelberg................... 214/83.2
3,501,030  3/1970  Flink............................. 214/83.2 X Primary Examiner—Evon C. Blunk
Assistant Examiner—W. Scott Carson
Attorneys—Hilmond O. Vogel and Richard J. Myers ABSTRACT: A hopper discharge arrangement includes a housing having a plurality of compartments and a material receiving trough therebeneath adapted to be connected to pneumatic conveying means. Each compartment is provided with a valve operable selectively to provide communication with the trough for selective discharge. Valve operating means includes a rotatable and slidable shaft including toggle linkage means in each compartment which is actuated by sliding or indexing movement of the shaft to provide for operative interengagement of an actuating element with said toggle linkage means.

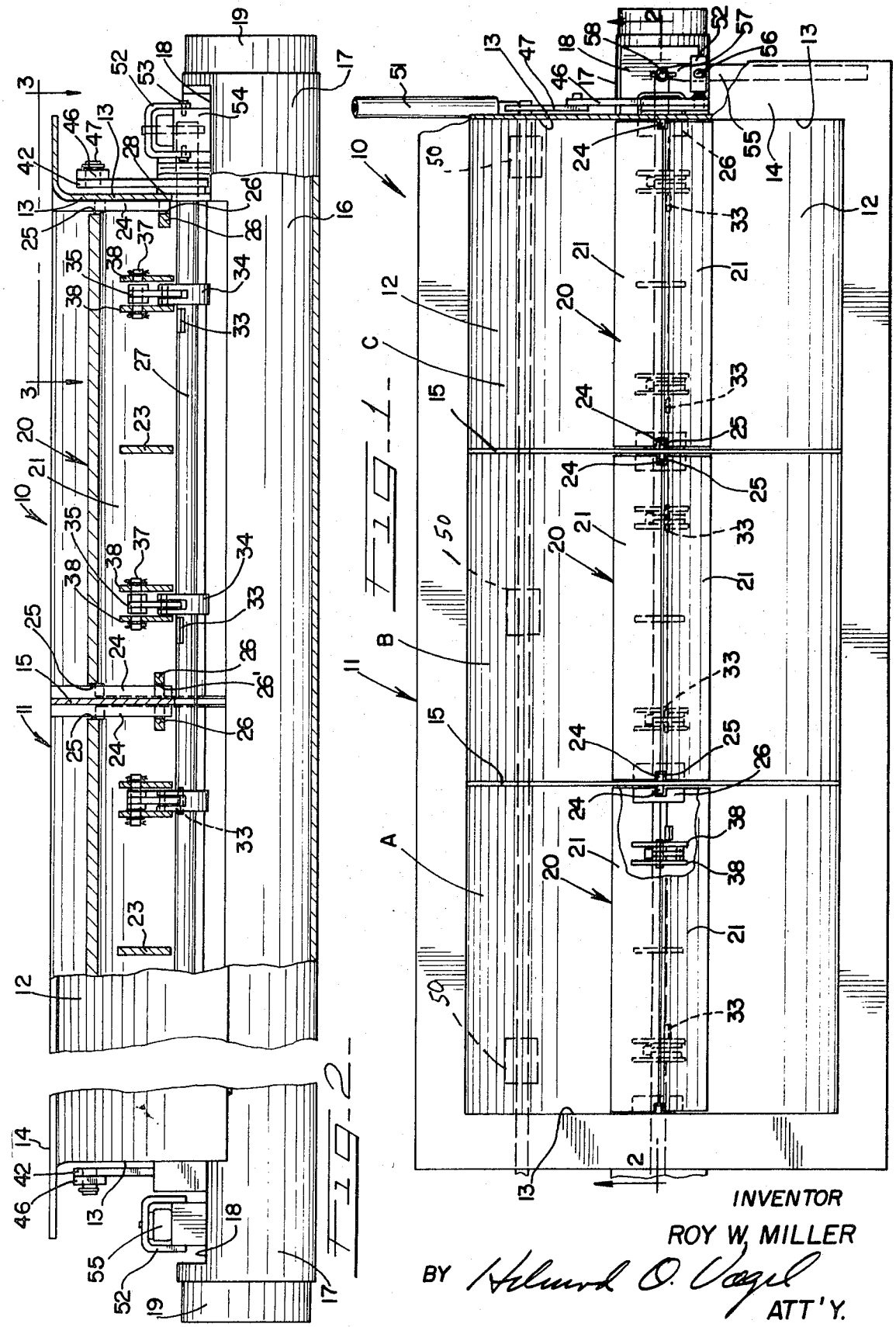

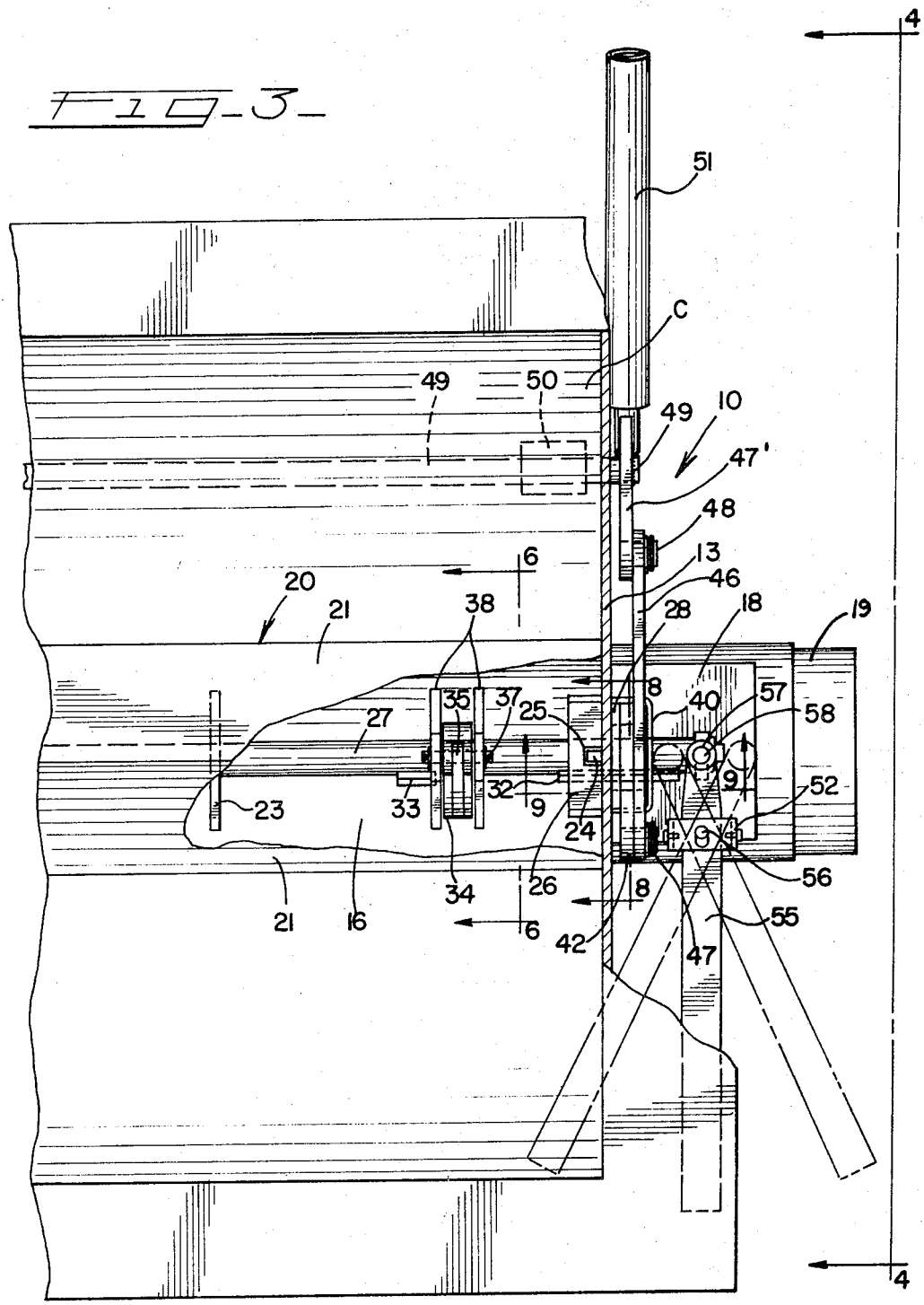

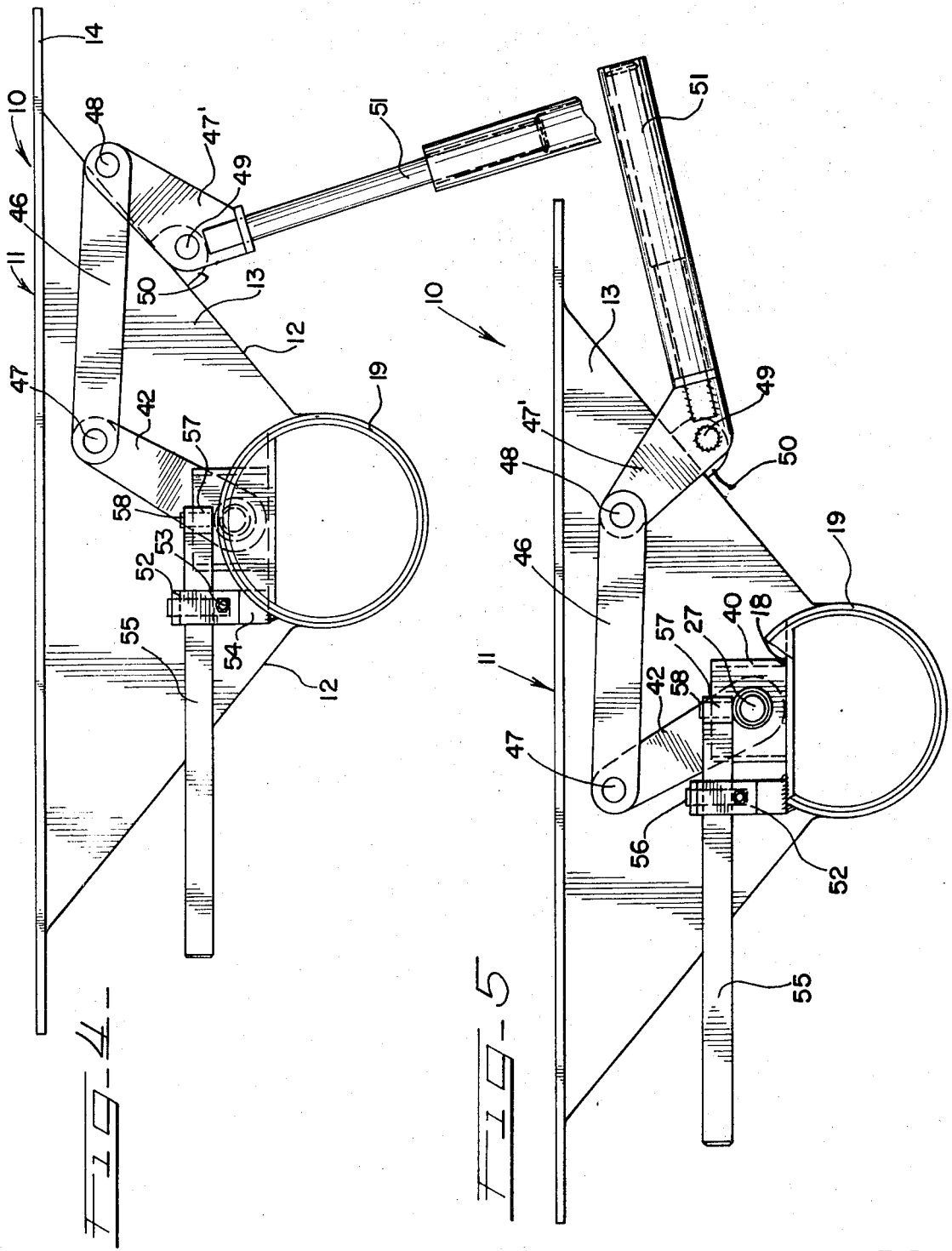

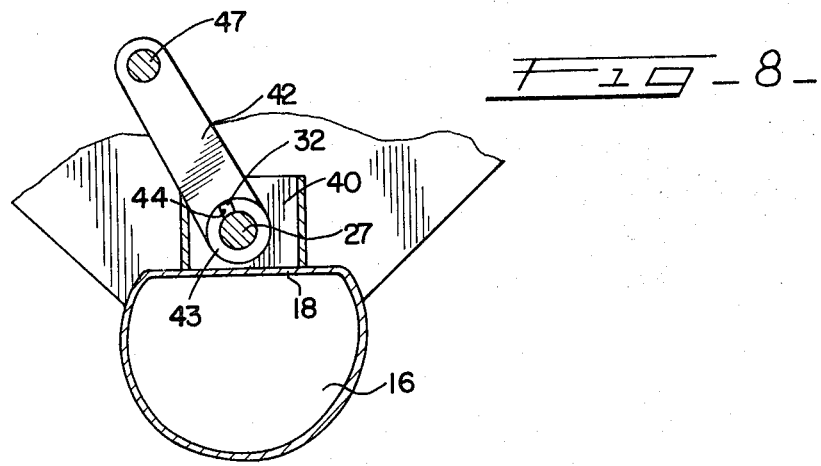
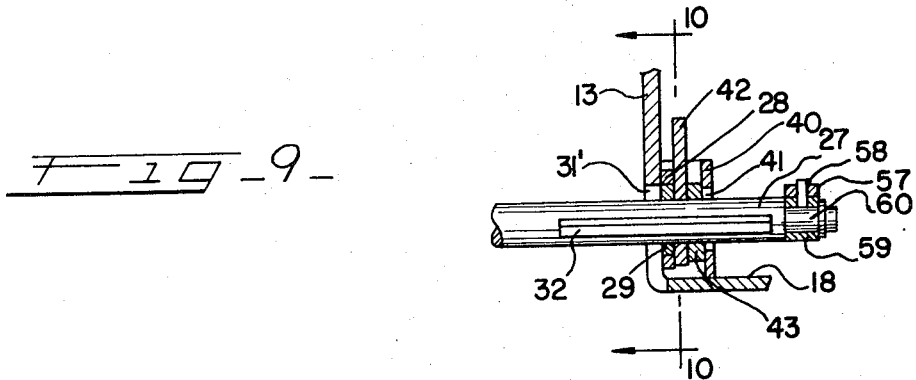
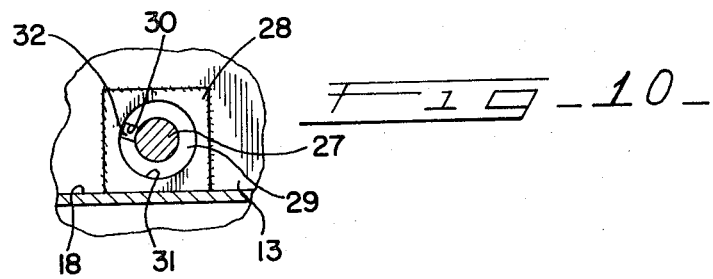

PNEUMATIC DISCHARGE ARRANGEMENT FOR HOPPERS

SUMMARY

It is a prime object of the present invention to provide an improved pneumatic discharge arrangement of simplified design to permit a selective discharge of material from a hopper. The arrangement includes a housing divided into a plurality of compartments each having a valve. The valves are connected to a shiftable and rotatable shaft which is actuated to provide for opening and closing movement of a single valve or a pair of valves as selected by the operator. The indexing or selecting means is positioned adjacent a lever arrangement provided for rotating the shaft to effectuate valve movement.

BRIEF DESCRIPTION OF THE DRAWINGS

FIG. 1 is a plan view of a hopper discharge arrangement with portions thereof broken away;

FIG. 2 is a cross-sectional view taken substantially along the line 2—2 of FIG. 1;

FIG. 3 is an enlarged view taken substantially along the line 3—3 of FIG. 2;

FIG. 4 is an end elevational view taken along the line 4—4 of FIG. 3;

FIG. 5 is an elevational view similar to FIG. 4 showing another operating position;

FIG. 8 is a cross-sectional view taken substantially along the line 8—8 of FIG. 3;

FIG. 9 is a cross-sectional view taken substantially along the line 9—9 of FIG. 3; and FIG. 10 is a cross-sectional view taken substantially along the line 10—10 of FIG. 9.

DETAILED DESCRIPTION

Figure 6:
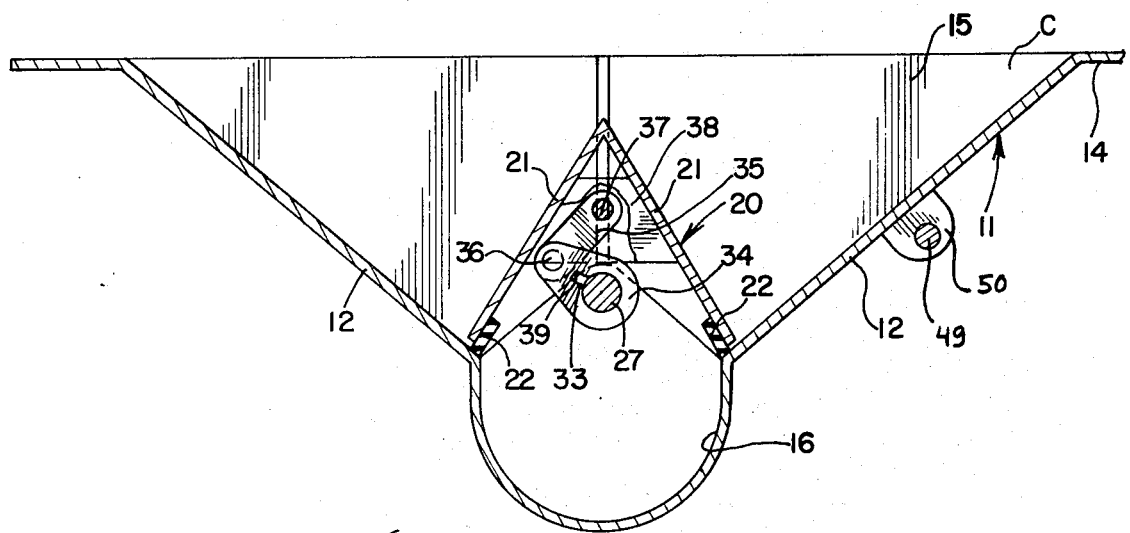
FIG. 6 is a cross-sectional view taken substantially along the line 6—6 of FIG. 3.

FIGS. 1 and 2 disclose a hopper discharge arrangement 10 including a housing 11 having opposed downwardly sloping walls 12. End walls 13 extend transversely with respect to and are connected to the walls 12 and the upper edges of said walls 12 and 13 are provided with a flange 14 extending substantially around the housing 11. The housing 11 is further provided with a plurality of transversely extending intermediate walls 15 in providing compartments A, B, and C. The compartments A, B, and C are in communication at their lower portions with a semitubular portion providing a trough 16 having at opposite ends thereof tubular end portions 17. Each tubular end portion 17 is provided with a horizontal upper flat wall 18 and a connector end 19 connected to each of the tubular ends 17 is adapted to be connected to a suitable pressure or vacuum conveying means for transferring material from the discharge arrangement 10. The discharge arrangement 10 also is adapted to be connected by means of its flanges 14 to the lower end of a suitable bin or hopper such as is conventional on railway cars for discharging material therefrom.

The compartments A, B, and C are each provided with a valve member 20 of an inverted V-shaped configuration. Each valve member 20 comprises valve plates 21 diverging downwardly and outwardly, and being provided at their lower edges with seal strips 22. As best shown in FIGS. 1 and 2, gussets 23 are longitudinally spaced and connected to the underneath surfaces of the valve plates 21. The valve members 20 are adapted to be moved vertically for opening and closing each compartment with respect to its associated trough portion 16 disposed directly therebeneath. The valve members 20 are guided in their vertical movement by vertical guide strips 24 connected to opposite sides of the intermediate walls 15 and to intermediate surfaces of the end walls 13 as best shown in FIGS. 1 and 2. The upper longitudinally spaced ends of each of the valve plates 21 is suitably apertured to provide slots 25. The slots 25 cooperate with the guide strips 24 for vertical guiding movement of each of the valve members 20. As best shown in FIGS. 1 and 2, transversely extending guide brackets 26 extend transversely across the valve members 20 and are suitably connected to the valve plates 21, each being provided with a slot 26' which serves to cooperate with each vertical guide strip 24 for further guiding the valve member 20 in its vertical movement.

Vertical movement of the valve members 20 is effectuated by a shaft 27 which extends the length of the housing 11, projects outwardly from the end walls 13, and is rotatably supported on plates 28 welded to the outer surfaces of the end walls 13. As best shown in FIG. 10, a bearing 29 includes a slot 30. The bearing 29 is rotatable in an opening 31 of the plate 28, the said shaft 27 being longitudinally movable relative to said bearing 29 and being rotatable therewith. At each end of the housing 11, one end being shown in FIG. 3, an end key 32 is provided on the shaft 27 to be longitudinally movable therewith. Each end key 32 is positioned for sliding movement within the slot 30 provided in each bearing 29 so that the shaft 27 is rotatable on said plates 28 and yet the shaft 27 and key 32 are relatively longitudinally movable with respect thereto. The wall 13, as best shown in FIG. 9, is suitably apertured as indicated at 31' to permit rotational movement of the key 32 and the shaft 27 without interference. The shaft 27 is also provided with longitudinally spaced keys 33, two of which are disposed in each of the compartments A, B, and C.

Figure 7:
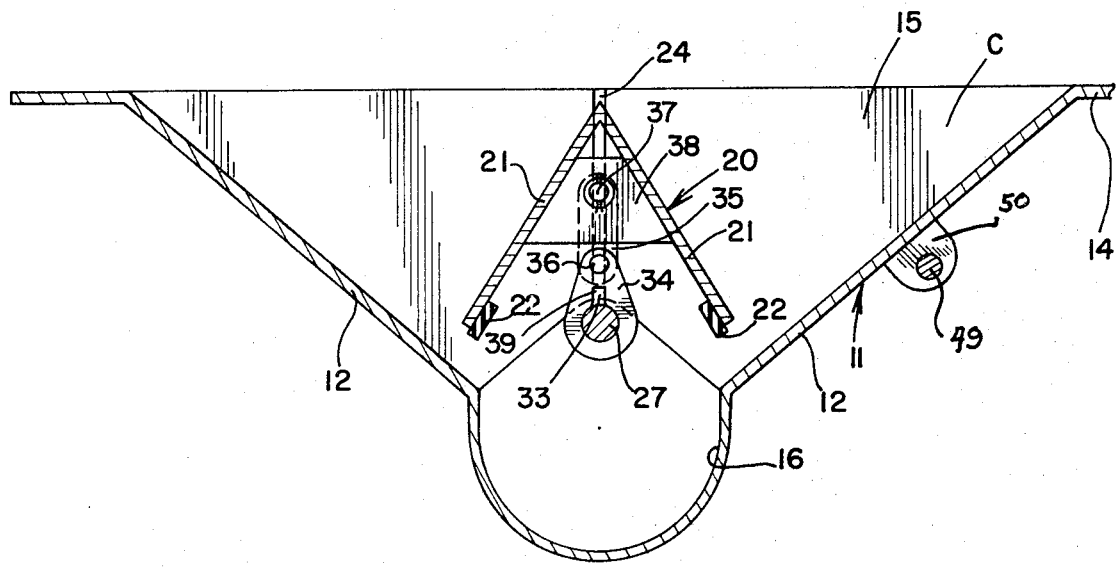
FIG. 7 is a cross-sectional view similar to FIG. 6 showing another operating position.

As best shown in FIGS. 6 and 7, the valve 20 is movable upwardly or downwardly for respective closing or opening movement to permit the discharge of material from the compartments A, B, and C to the trough 16 for discharge pneumatically therefrom. Such vertical movement of each of the valves 20 is effectuated by a pair of toggle linkages disposed in each of the compartments. Each toggle linkage comprises a link 34 which is connected to the shaft 27 for rotating movement therewith. The link 34 is pivotally connected to a link 35 as indicated at 36 and a pivot pin 37 connects the link 35 to a pair of spaced brackets 38 which as best shown in FIGS. 3, 6, and 7 are securely connected to the inner surfaces of the valve plates 21. Each link 34 also is provided with a longitudinally extending slot 39 which is engageable by one of the keys 33 for effecting movement of the link 34 in response to rotating movement of the shaft 27. Thus by rotation of the links 34 from the position indicated in FIG. 6 to the position indicated in FIG. 7, the valve 20 may be raised and lowered to a plurality of positions for either closing or opening relation with respect to the trough 16 disposed underneath each of the compartments A, B, and C.

The shaft 27 may be moved longitudinally, thus the keys 33 are also moved slidingly within the slots 39 while at the same time rotational movement of the shaft 27 will effectuate action of the toggle linkage described.

A U-shaped retainer bracket 40 is disposed on the outer surfaces of each of the end walls 13 as best shown in FIGS. 3, 4 and 5, and as shown in FIG. 9, the bracket 40 is provided with an opening 41 of sufficient diameter to permit rotation of the shaft 27 and projecting key 32. The link 42 is provided at its lower end, as best shown in FIGS. 8 and 9, with a spacer hub portion 43 which includes a slot 44 extending through the said spacer 43 and the link 42. The hub spacer slot 44 accommodates the key 32 so as to permit longitudinal movement of said key 32 with the shaft 27 and yet during rotational movement of the shaft 27 providing for rotating movement of the link 42. The hub spacer 43 also, as shown in FIG. 9, prevents longitudinal movement of the link 42 when the shaft 27 is moved longitudinally as will presently be described.

As best shown in FIGS. 4 and 5, the link 42 is connected to a link 46 by means of a pivotal connector 47. The link 46 is connected to a lever arm 47' by means of a pivotal pin connection 48. A shaft 49 connected to the lever arm 47' for movement therewith is pivotally supported on brackets 50 longitudinally connected at spaced points to one of the sloping walls 12 as best shown in FIGS. 1, 4, and 5. A hand lever 51 connected to each of the lever arms 47' provided at opposite ends of the housing 11 may be actuated to operate the toggle linkage for effecting selected movement of the valves 20 as will be described hereinafter.

The shaft 27 is longitudinally shiftable and this is achieved by means of a structure including a channel bracket 52 supported on the flat surfaces 18 provided at the opposite ends of the housing 11. Each channel bracket 52 is secured by means of screws 53 to a support 54 suitably supported on each surface 18. A horizontally extending lever 55 is pivotally connected by means of a pivot pin 56 to each channel bracket 52 and has one end portion projecting above the vertical center line of the trough 16 and is pivotally connected to the opposite ends of the shaft 27 by means of pins 58 extending through a pivot head 57 provided at one end of the lever 55. The pin 58 is connected to a pivot sleeve 59 rotatably supported on a reduced shaft portion 60 to accommodate rotation of the shaft 27.

THE OPERATION

As indicated above the hopper discharge arrangement 10 may be suitably connected to the underneath portion of a hopper containing materials which may be suitably discharged through a pneumatic or pressure conveying system. Such hoppers are particularly adapted for hopper car operation wherein the car is moved to a destination where pneumatic unloading facilities are present and whereupon materials can be discharged from the hopper car by such means. Hopper cars of the type to which the present invention is particularly suited include a plurality of hoppers and each of these will embody one of the hopper discharge arrangements 10. As one of the hoppers is to be unloaded a suitable connection from a pneumatic discharge and conveying unit is connected over one end of the connector 19 with the other connector 19 being open to the atmosphere. Each of the valve plates 20 may be moved individually or the valve plates A and B may be moved simultaneously as well as the valve plates B and C. Sequential discharge of the material through the compartments A, B and C may be desired in order to effectuate proper unloading of material from the hopper. In FIG. 1, the shaft 27 has been moved so that the keys 33 are in engagement with the slots 39 of the links 34 disposed in the compartment B. Thus upon rotation of the shaft 27 the keys 33 are in engagement with the slots 39 so that rotation of the links 34-35 is effected to raise the valve member 20 from the position shown in FIG. 2 to the position shown in FIG. 7.

The positions of FIGS. 6 and 7 refer to the compartment C but the operation of the valves 20 is identical in each of the compartments. Thus upon rotation of the handle member 51 and the toggle linkage represented by lever 47' and links 42, 46 rotation of the shaft 27 provides for the vertical movement indicated in FIGS. 6 and 7. During the raised position of the valve 20 as shown in FIG. 7, the linkage 42, 46 is in the position shown in FIG. 4. Similarly, when the valve 20 has again been closed the linkage 42, 46 and 47' is in the position shown in FIG. 5. Thus the valve 20 in compartment B has been actuated and material through said compartment has been discharged from the hopper. The operation is identical for each of the valve members 20 disposed in the compartments. However, in order to effectuate valve opening or closing movement of the valve member 20 in compartment C the shaft 27 would have to be moved to the right whereupon the keys 33 engage the slots 39 of the links 34 disposed in the compartment C whereupon the valve 20 may be actuated independently of the compartments A or B. Likewise if the valve member 20 in compartment A is to be actuated the keys 33 are moved to the left, shown in FIG. 1, whereupon the keys 33 engage the slots 39 of the links 34 disposed in compartment A so that upon rotation of the shaft 27 operating movement of the valve 20 is brought about. Thus the operator by merely moving the shaft 27 longitudinally during actuation of the lever 55 is adapted to be set or indexed to a selected position dependent upon the choice of the operator. He can select either the valves 20 in compartments A, B, or C or he may wish to actuate the valve members 20 in compartments A and B simultaneously or in compartments B and C simultaneously. The combined actuation of two adjacent valves is achieved by moving or indexing the shaft 27 by means of the handle 55. In FIG. 1, if it is desired to actuate the valves 20 in compartments A and B, the shaft 27 is moved to the left a sufficient distance so that the keys 33 in compartment B are still in connected engagement with respect to the levers 34 in the said compartment B, and the keys 33 in compartment A are also moved into engagement with the slots 39 of the links 34 disposed in compartment A. A similar selection of the two other valves 20 in compartments B and C may be achieved by moving the shaft 27 and keys 33 to the right from the position shown in FIG. 1.

Thus it can be seen that each valve may be moved independently within each compartment or the valves of adjacent compartments can be moved in concert without effectuating movement of the remaining valve. The arrangement is particularly simple in indexing and can be achieved from both ends of the housing 11. Thus actuation of the arrangement from opposite sides of a railway hopper car can readily be achieved. Indexing or selection of certain compartmental valves is a simple matter and positive selection is achieved.

What is claimed is:

1. A pneumatic discharge arrangement for a hopper including a housing having opposed sloping walls converging into a longitudinal trough at their lower ends adapted to connect to pneumatic conveying means, said housing including laterally extending walls providing a plurality of compartments communicating with said trough, the improvement comprising:
   a valve plate in each compartment adapted to be moved from open to closed positions for regulating the discharge of material to said trough,
   means for moving said plate including a shaft rotatably supported on said housing and being longitudinally shiftable within said compartments,
   a linkage means within each compartment supported on said shaft to be actuated thereby,
   means pivotally connecting each said linkage means to each said valve plate means,
   means for rotating said shaft,
   an actuating element on said shaft within each compartment, and
   means for shifting said shaft longitudinally whereby said actuating means may be selectively engaged with at least one of said linkage means to move an associated valve plate for moving the same between open and closed positions.

2. The invention in accordance with claim 1, said valve plate including laterally spaced sealing edges adapted to engage said sloping walls in the closed position.

3. The invention in accordance with claim 2, said plate having an inverted V-shaped configuration including diverging walls providing said sealing edges.

4. The invention in accordance with claim 1, said linkage means including a first link rotatably connected to said shaft with said shaft being slidable relative thereto, and a second link pivotally connected to said first link and to said valve plate.

5. The invention in accordance with claim 1, said valve plate including spaced walls engageable with said lateral walls for closing communication of said compartments with said trough, said linkage means comprising toggle links, one of which is connected to said plate between said walls, and the other of said links being pivotally connected to said shaft, said actuating means engaging said toggle links during shifting movement of said shaft to actuate the same.

6. The invention in accordance with claim 1, each actuating element including a key on said shaft engageable with an aperture in each linkage means.

7. The invention in accordance with claim 1,
said linkage means comprising a toggle linkage having one end thereof pivotally connected to said shaft and another end pivotally connected to said valve plate,
said shaft being slidable through said pivotal connection of said first end, and each said actuating element being engageable with one of said toggle links during shifting movement.

8. The invention in accordance with claim 1,
said means for rotating said shaft including a lever pivotally supported on said housing, and
a toggle linkage having one end pivotally connected to said lever and another end rigidly connected to said shaft.

9. The invention in accordance with claim 8,
said means for shifting said shaft longitudinally including lever means pivotally supported on said housing and pivotally connected to said shaft.

10. The invention in accordance with claim 9,
said trough having conduit portions at opposed ends thereof adapted to be removably connected to said conveying means.

11. The invention in accordance with claim 1,
including guide means between said walls and said valve plate for guiding movement of said valve plates in a vertical direction.

* * * * *